June 24, 1941.   C. CHRISTIANSEN   2,246,617
SOIL BASIN TILLER
Filed Nov. 22, 1939

Inventor:
Christian Christiansen

Patented June 24, 1941

2,246,617

UNITED STATES PATENT OFFICE 2,246,617

SOIL BASIN TILLER

Christian Christiansen, Fargo, N. Dak.

Application November 22, 1939, Serial No. 305,669

5 Claims. (Cl. 97—55)

The invention relates to a new and improved machine designed primarily for soil tillage and cultivation.

The principal object of the invention is to provide an earth working implement designed for the digging of holes or pockets in geometrical pattern in the ground for the collection of rain water or snow to aid in irrigation. Excessive rain water rapidly drains or runs off the ground depending on the slope of the land, resulting in a small percentage of moisture penetration or retention. The present invention is designed to provide an obstruction to the flow of surface water by the construction of a pattern of holes or pockets in the ground for collecting and retaining the water, until it can be absorbed by seepage thereby raising the sub-surface moisture content. In addition the present invention is so designed that furrows instead of pockets or holes may be made in the ground to collect excess surface moisture or trap snow. In the case of contour cultivation on steep slopes contour furrows will retain a higher percentage of surface run off than a pattern of holes or pockets.

A further object is to provide an earth working implement which will form barriers in the form of holes or pockets, furrows, and accompanying higher elevation earth deposits for the trapping of the top soil set in motion by heavy winds. During periods of cultivation the lack of vegetation aids wind erosion. By the creation of suitable traps from time to time wind erosion can be controlled during the growing season, while at the same time retaining all the rain water possible which water storage and subsequent seepage also has a retarding effect on soil erosion. In the case of crop rotation where certain land is permitted to lie idle or supporting little or no vegetation, it is essential that such land be properly cultivated so that provisions are made to trap all the rain water or snow possible and at the same time control soil erosion due to cutting winds.

A further object of the invention is to provide a machine of the class described, embodying a rigid frame structure with V type hitch and suitable cultivator beams and shovels supported on cam lifting wheels, which permits successive raising and lowering of frame with attached shovels for the formation of holes or pockets.

Another aim is to provide novel and advantageous means for locking cam lifting wheels to the frame, permitting the frame with attached shovels to remain at a fixed height for the formation of furrows.

Yet another aim is to provide novel and advantageous means for locking cam lifting wheels in place, permitting frame with attached shovels to remain at a fixed height above ground for transportation purposes.

With the foregoing in view, the invention resides in the novel subject matter hereinafter described and claimed, description being accomplished by reference to the accompanying drawing.

Figure 1:
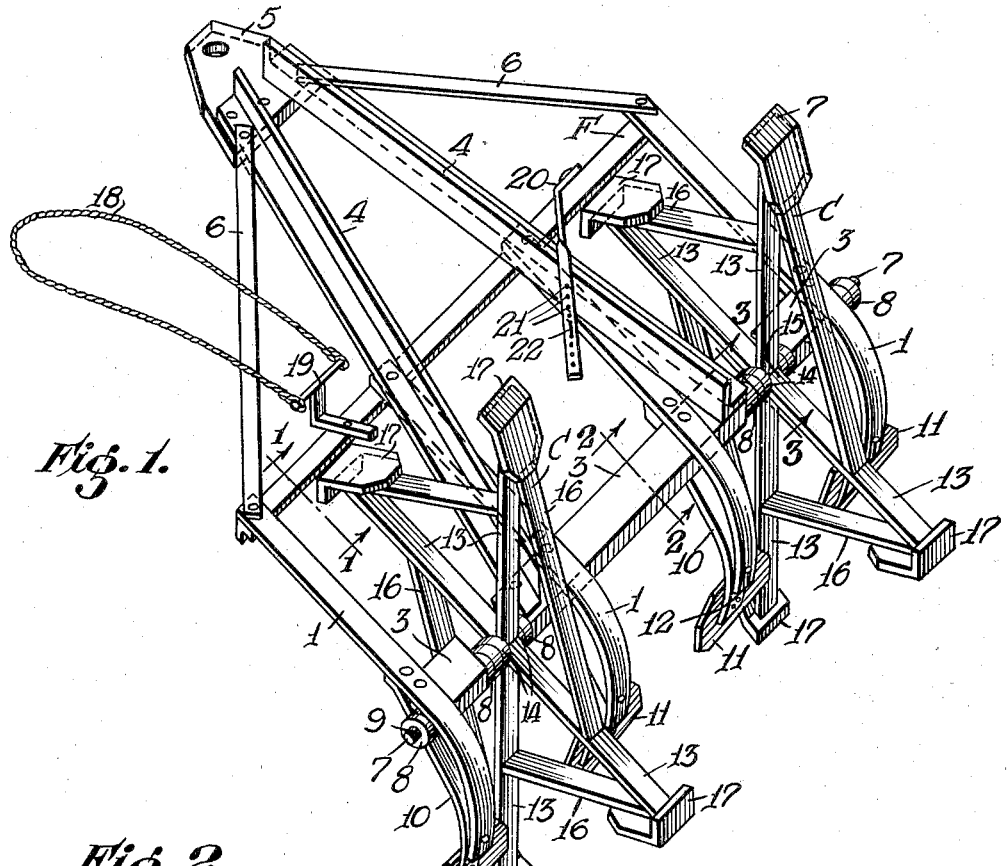
Fig. 1 is a perspective viewed from the left rear.
Figure 2:
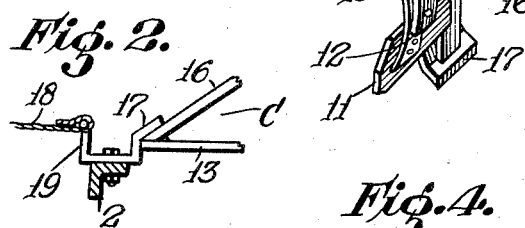
Fig. 2 is a vertical longitudinal sectional view substantially on line I—I of Fig. 1.
Figure 4:
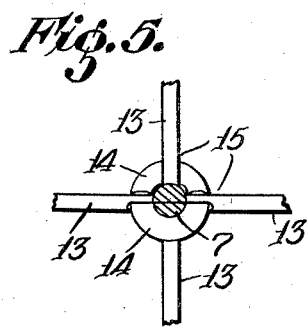
Fig. 4 is a vertical longitudinal sectional view substantially on line 2—2 of Fig. 1.
Figure 3:
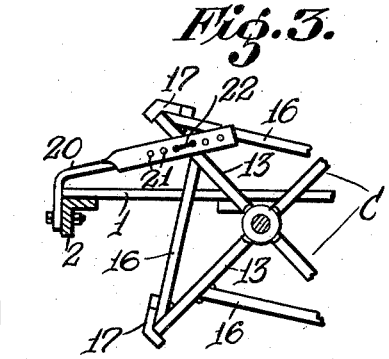
Fig. 3 is a vertical longitudinal sectional view showing cam wheel in locked position.
Figure 5:
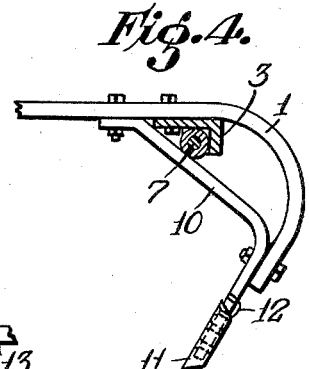
Fig. 5 is a detail longitudinal sectional view on line 3—3 of Fig. 1 showing hub structure of cam wheel.

One form of construction has been selected for illustration in the present disclosure and will be rather specifically described, with the understanding however, that variations may be made within the scope of the invention as claimed.

I provide a frame F to be pulled over the ground. This frame F includes cultivator beams 1 which are interconnected by two cross angles 2, 3 and two angles 4 attached to plate 5 forming the V type hitch with necessary braces 6 tying in V hitch with cross angle 2. Rear cross angle 3 is in three parts to which segments of pipe 16 have been welded to form the bearings which take the shaft 7 to which cam wheels C have been welded in position. Necessary collars or washers 8 and cotter pins 9 are used to secure a minimum of end play and/or friction. Reinforcing bars 10 are used to strengthen and lengthen the cultivator beams 1 and take the shovels 11. Extra holes 12 are provided in reinforcing bars 10 to permit adjusting shovels 11 for depth of soil penetration.

The cam wheels C consist of four radial bars 13 spaced at ninety degree intervals around shaft 7 and welded thereto together with suitable washers 14 serving as side plates forming hub 15 of cam wheel. Suitable reinforcing bars 16 connect the outer extremities of radial bars 13 to a suitable point on its following radial bar 13 in clockwise rotation. At the outer extremities of the radial bars 13 and their junction with reinforcing bars 16 suitable shoes 17 are attached to provide better traction during cultivation and more bearing surface when machine is being transported on cam wheel shoes 17.

The welding of the two cam wheels C in position on shaft 7 with their corresponding radial bars 13, reinforcing bars 16, and shoes 17 in the same respective planes allows the frame F and attached shovels 11 to be in a parallel position with the ground at all times during operation and/or transit, insuring a uniform depth of holes, pockets and/or furrows and little or no side draft.

A pull on cord 18 attached to bar lock 19 on cross angle 2 engages one of the cam wheel shoes 17 preventing rotation of cam wheels on shaft 7, thereby keeping frame F and attached shovels 11 in a horizontal locked position above the ground during transportation on the cam wheel shoes 17 in the next radial plane in a counter clockwise direction.

Bar lock 20 attached to cross angle 2 just ahead of a cam wheel C is provided with suitable adjustment holes 21 and a U clamp 22 with which bar lock 20 can be clamped to one of the cam wheel radial bars 13 locking cam wheels C in place and permitting the frame F to remain during cultivation at a fixed height above the ground and attached shovels 11 at a fixed depth in the soil. The application of bar lock 20 can therefore be used as a depth gauge when furrow cultivation is desired.

It will be seen from the foregoing that novel and advantageous provision has been made for carrying out the objects of the invention. While the general construction shown and described, may be followed if desired, variations may be made within the scope of the invention as claimed.

I claim:

1. A machine of the class described comprising a rigid frame, consisting of a V type hitch and cultivator beams and shovels with necessary cross bar reinforcing, supported on like cam lifting wheels rigidly attached and in step to a shaft turning in bearings fixed to the rear frame cross bar, permitting the successive raising and lowering of the frame with attached shovels for the formation of holes or pockets in geometrical pattern in the ground.

2. A machine of the class described comprising a rigid frame, consisting of a V type hitch and cultivator beams and shovels with necessary cross bar reinforcing, supported on like cam lifting wheels rigidly attached and in step to a shaft turning in bearings fixed to the rear frame cross bar, said cam wheels being provided with curved shoes attached to their radial reinforced spokes to provide additional traction for cultivation and additional bearing surface when machine is being transported.

3. A machine of the class described comprising a rigid frame, consisting of a V type hitch and cultivator beams and shovels with necessary cross bar reinforcing supported on like cam lifting wheels rigidly attached and in step to a shaft turning in bearings fixed to the rear frame cross bar, having suitable locks, clamps, or other locking devices mounted on the frame to lock the cam wheels when not in motion or to stop motion, permitting the shovels to rest above the ground when the machine is not in operation or when the machine is being transported.

4. A machine of the class described comprising a rigid frame, consisting of a V type hitch and cultivator beams and shovels with necessary cross bar reinforcing, supported on like cam lifting wheels rigidly attached and in step to a shaft turning in bearings fixed to the rear frame cross bar, having locks attached to the frame being controlled from a distance by cords or the like for unlocking or locking the cam wheels in or out of motion.

5. A machine of the class described comprising a rigid frame, consisting of a V type hitch and cultivator beams and shovels with necessary cross bar reinforcing, supported on like cam lifting wheels rigidly attached and in step to a shaft turning in bearings fixed to the rear frame cross bar, having lock or locks attached to the frame for locking the cam wheel or wheels in certain positions, thereby permitting the frame to stay at a fixed height above the ground and attached shovels at a fixed depth in the ground for the formation of furrows in the ground, the depth of which is gauged by the setting of the lock or locks.

CHRISTIAN CHRISTIANSEN.